United States Patent [19]
Leland

[11] 3,820,821
[45] June 28, 1974

[54] REMOVABLE FIFTH WHEEL HITCH
[75] Inventor: Chester W. Leland, Centreville, Mich.
[73] Assignee: Leland Engineering, Inc., White Pigeon, Mich.
[22] Filed: June 11, 1973
[21] Appl. No.: 368,734

[52] U.S. Cl. ......... 280/423 R, 280/415 B, 280/433, 280/490 R
[51] Int. Cl. ............................................. B62d 53/08
[58] Field of Search ............ 280/423 R, 433, 415 B, 280/405 A, 407, 490 R

[56] References Cited
UNITED STATES PATENTS

| | | | |
|---|---|---|---|
| 2,854,250 | 9/1958 | Smith | 280/507 |
| 2,925,286 | 2/1960 | Hodges et al. | 280/423 R X |
| 3,246,912 | 4/1966 | Cunha | 280/407 |
| 3,336,051 | 8/1967 | Dale | 280/423 R |
| 3,392,992 | 7/1968 | Baker et al. | 280/423 R |
| 3,527,476 | 9/1970 | Winckler | 280/423 B |
| 3,759,545 | 9/1973 | McKethan | 280/423 R |
| 3,776,573 | 12/1973 | Paielli | 280/405 A |

*Primary Examiner*—Leo Friaglia
*Attorney, Agent, or Firm*—Oltsch & Knoblock

[57] ABSTRACT

A fifth wheel hitch in which a kingpin lock and bearing plate is pivotally supported upon a coupler plate which is removably attached by sliding cooperation with a mounting bracket connected to the bed of a pickup truck or similar towing vehicle.

5 Claims, 8 Drawing Figures

REMOVABLE FIFTH WHEEL HITCH

SUMMARY OF THE INVENTION

This invention relates to a fifth wheel hitch and will have specific, but not limited, application to a removable fifth wheel hitch utilized to secure a recreational or similar towed vehicle to a pickup truck.

The hitch of this invention includes a bearing plate which is adapted to support a frame member of a trailer which carries a depending kingpin. The bearing plate includes a lock for pivotally securing the trailer kingpin and is pivotally secured to a coupler plate. A mounting bracket which is of a low-profile configuration is secured to the bed of a towing vehicle, such as a pickup truck, between the side walls thereof. The mounting bracket and coupler plate include cooperating slidably interlocking flanges and lip parts which enable the coupler plate to be inserted endwise, transversely relative to the vehicle, into locking cooperation with the mounting bracket and secured to the bracket. When it is desired to utilize the pickup truck for matters other than the towing of a trailer, the coupler plate of the hitch is disconnected from the mounting bracket of the hitch and conveniently stored. Such connection and disconnection of the coupler plate to and from the mounting bracket can be accomplished without the utilization of any special hand tools and in a rapid and simple manner.

An additional feature of the hitch of this invention includes the utilization of a telescopic pin box which carries the kingpin of the trailer and which is secured to the trailer frame. The utilization of the telescopic pin box allows the vertical location of the kingpin to be selectively varied so as to accommodate various types and positions of fifth wheel hitch bearing plates when connected to various types of towing vehicles.

Accordingly, it is an object of this invention to provide a removable fifth wheel hitch which is secured to a towing vehicle.

Another object of this invention is to provide a fifth wheel hitch having the bearing plate, which supports the frame of a trailer, removably connected to a mounting bracket which is of low profile and fixedly secured to the towing vehicle.

Another object of this invention is to provide a fifth wheel hitch having a bearing plate including a trailer kingpin lock which can be quickly removed and reattached to the towing vehicle with the use of only simple hand tools.

Still another object of this invention is to provide a fifth wheel hitch which accommodates a trailer kingpin having adjustable vertical positions.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 5:
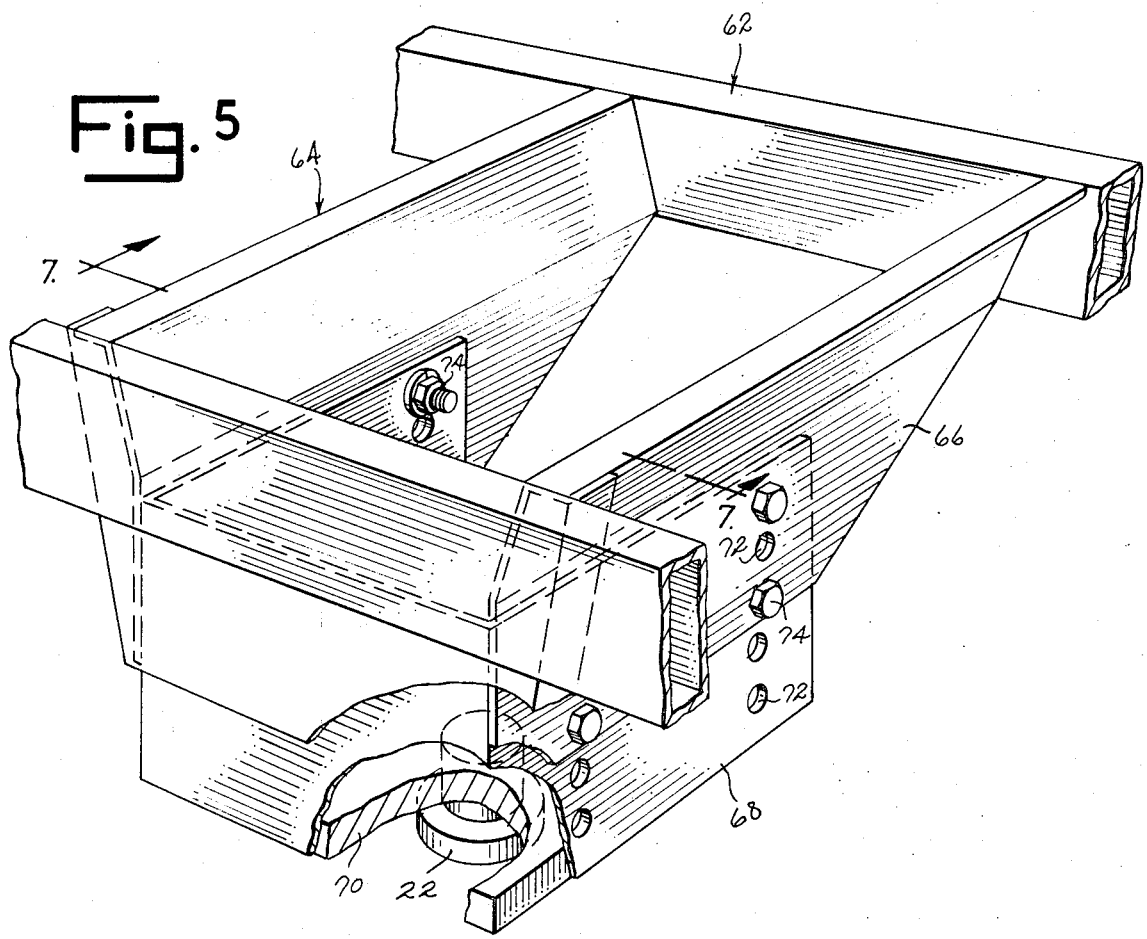
FIG. 5 is a fragmentary perspective view of a part of the trailer shown disconnected from the fifth wheel hitch and with portions thereof broken away for purposes of illustrating the location of the trailer kingpin.
Figure 6:
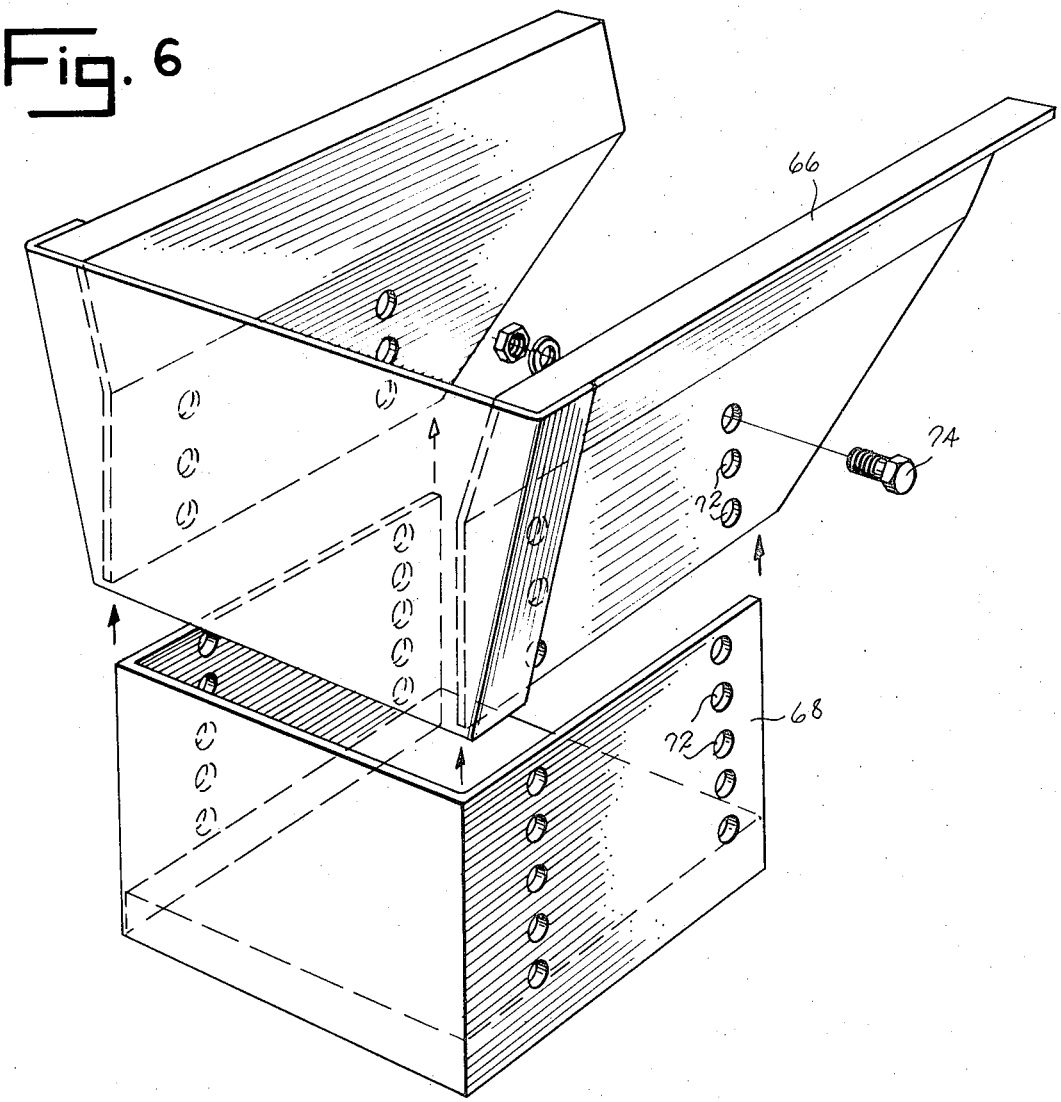
FIG. 6 is a view of parts utilized to connect the kingpin to the trailer frame and shown in exploded view.

The fifth wheel of this invention includes a bearing plate 10 which is pivotally connected by means of spaced end supports 12 to a coupler plate 14. A pin 16 pivotally connects bearing plate 10 to each end support 12 so that the bearing plate is pivotal about a horizontal axis. Bearing plate 10 has a slot 18 formed therein and includes suitable jaws 20 or similar locking devices for the purpose of pivotally securing the trailer kingpin 22, which is best seen in FIG. 5, to the bearing plate. The precise construction and manner of operation of jaws 20 can vary, depending upon the manufacturer of the hitch. Coupler plate 14 includes a central web part 24, depending side or leg parts 26 which parallel one another and which extend downwardly from opposite side edges of web part 24. Leg parts 26 terminate in oppositely extending outturned feet or flange margins 28. Flange margins 28 are coplanar and include paralled outer edges 30.

Secured to the bed 32 of pickup truck 34 is a mounting bracket 36. Mounting bracket 36 is bolted or otherwise secured to the bottom 38 and underlying frame of truck bed 32, preferably centered between side walls 40 of the bed. Mounting bracket 36 includes a bottom wall 42, spaced parallel vertical side walls 44 which terminate in inturned lips 46. Lips 46 are oppositely positioned and are spaced above bottom wall 42. In the illustrated embodiment of mounting bracket 36, the bracket also includes a large mounting plate having a plurality of holes therein to allow the mounting bolts to be variously located to accommodate different types of towing vehicles. A separate mounting bracket part consisting of bottom wall 42, side walls 44 and lips 46 is welded to the mounting plate. It is to be understood that in some constructions of this invention the mounting bracket may consist only of a one-piece part having a bottom wall 42, side walls 44 and lips 46 which is secured directly at wall 42 to bottom 38 of the towing vehicle bed.

Figure 1:
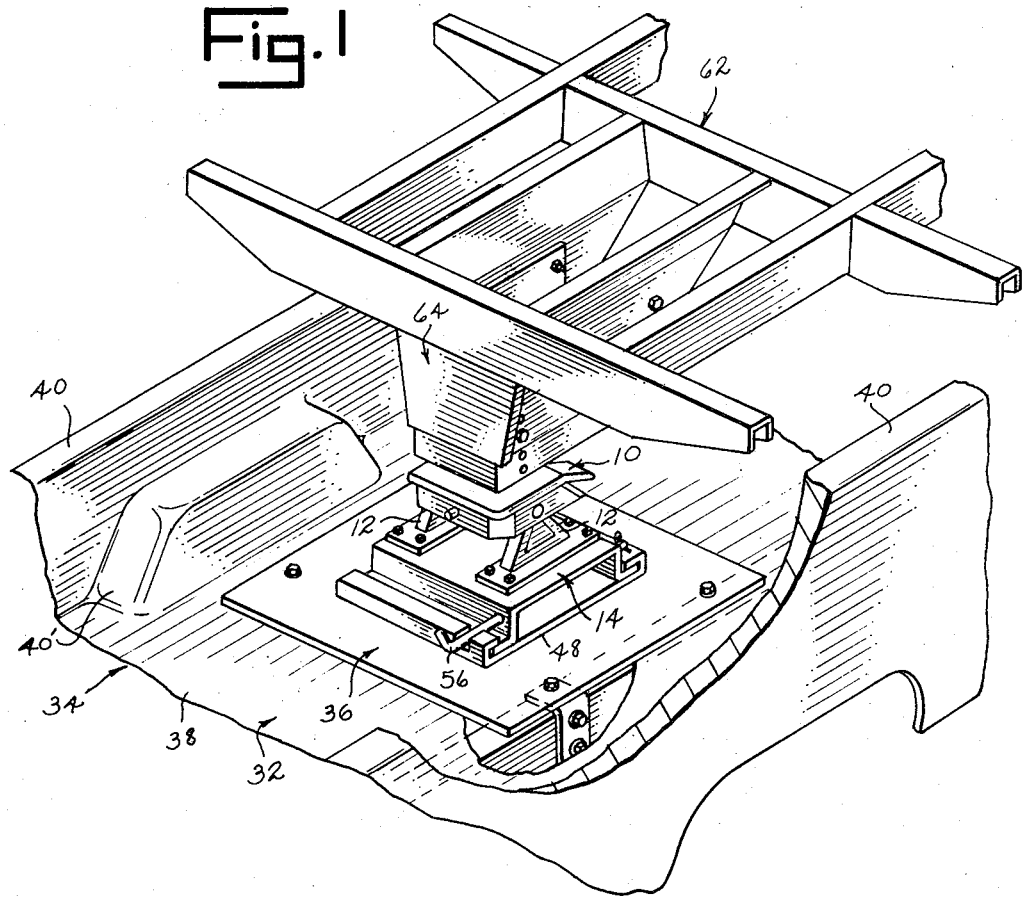
FIG. 1 is a fragmentary perspective view of a fifth wheel hitch of this invention shown coupled to the kingpin of a trailer.
Figure 3:
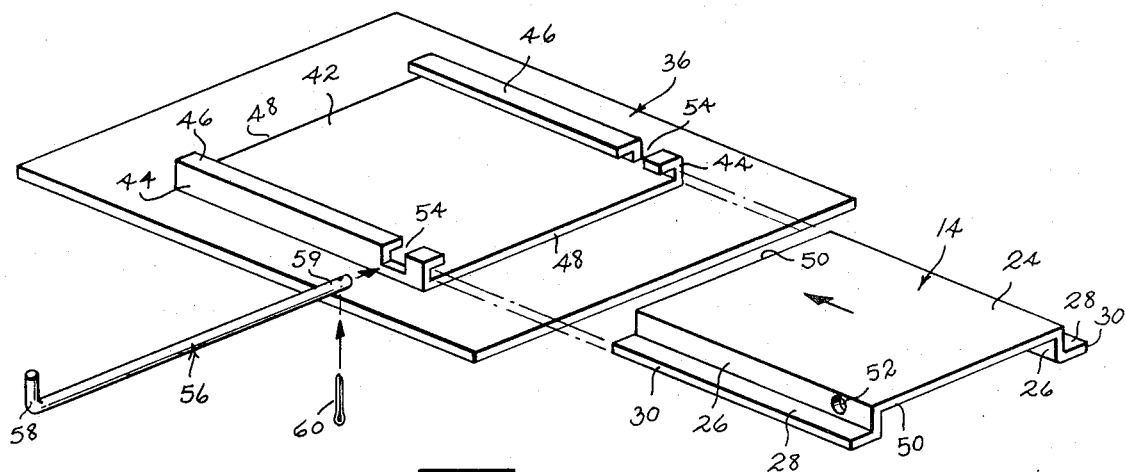
FIG. 3 is a view of parts of the fifth wheel hitch of this invention shown in exploded form for purposes of illustrating the assembly thereof.
Figure 2:
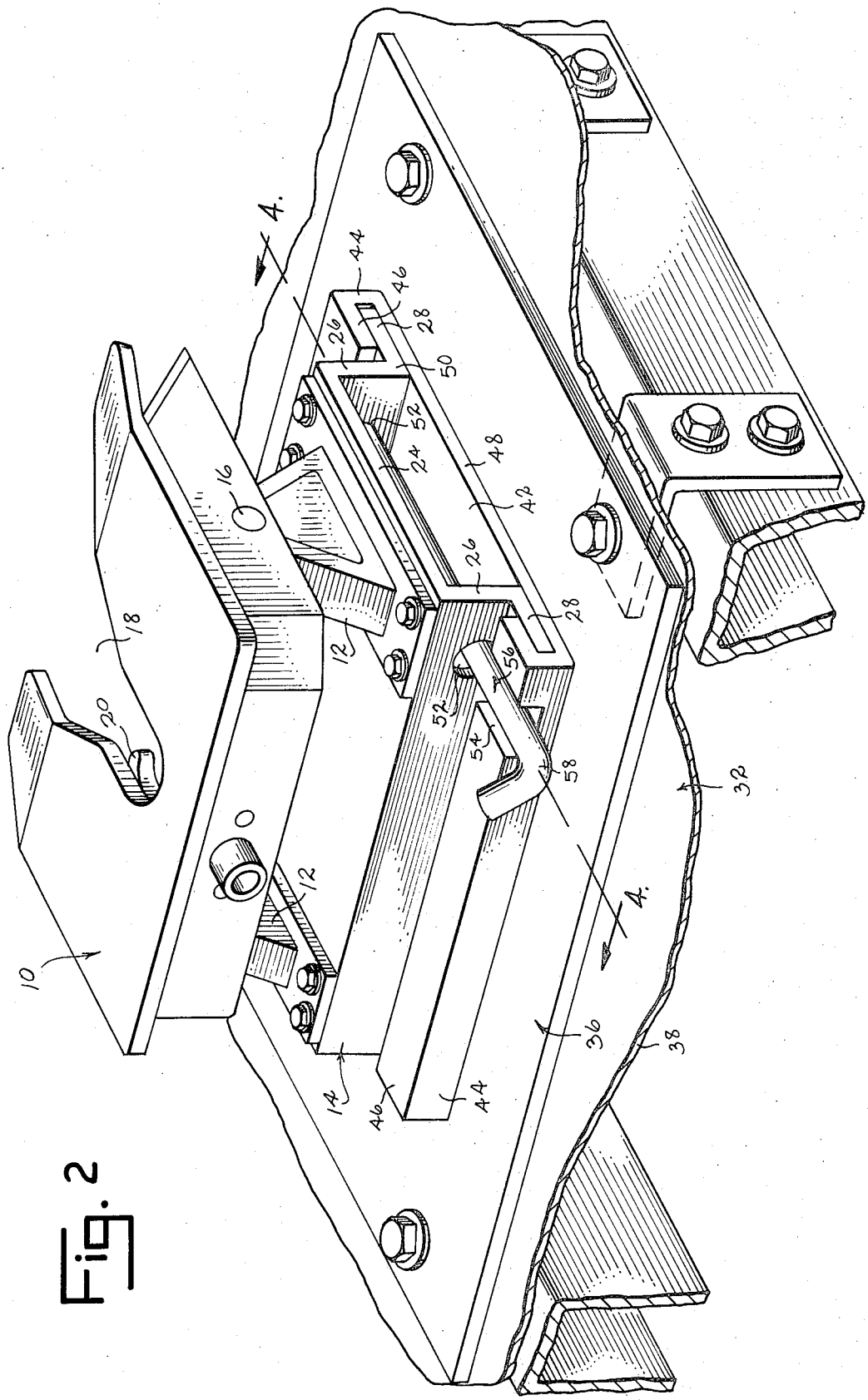
FIG. 2 is a perspective view of the fifth wheel hitch shown in FIG. 1 without the trailer coupled thereto.
Figure 4:
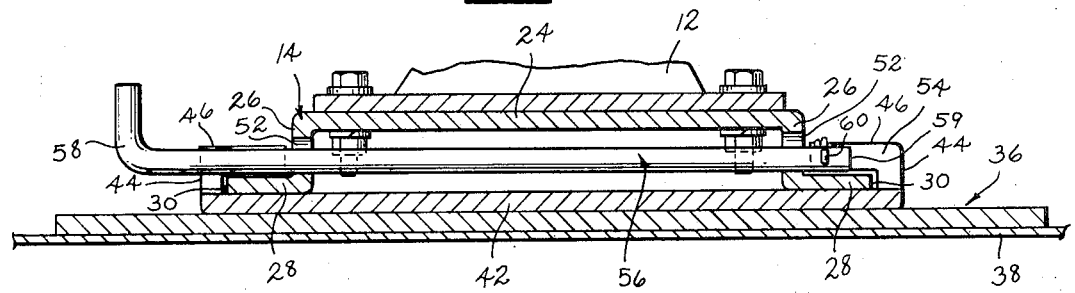
FIG. 4 is a fragmentary sectional view taken along line 4—4 of FIG. 2.

The spacing between side walls 44 of mounting bracket 36 is slightly greater than the distance between outer edges 30 of coupler plate flange margins 28. Additionally, the spacing between each lip 46 and underlying bottom wall 42 of the mounting bracket is slightly greater than the thickness of coupler plate flange margins 28 so as to enable the coupler plate 14 to be inserted endwise, as illustrated in FIG. 3, into interlocking engagement with mounting bracket 36 in which flange margins 28 of the coupler plate are positioned under lips 46 of the mounting bracket, as best shown in FIGS. 2 and 4. It is to be noted that each lip 46 of the mounting bracket terminates spacedly from leg part 26 of the interlocking coupler plate. The spacing between each end 48 of mounting bracket wall 42 and the adjacent side wall 40 of truck bed 32, which may include an inwardly protruding fender well 40', exceeds the length of coupler plate 14 as measured between its ends 50 so as to enable the coupler plate to be inserted endwise into and removed endwise from the mounting bracket with the bracket remaining secured to bed 32 of the truck.

Due to the interlocking cooperation between flange margins 28 of coupler plate 14 and lips 46 of mounting bracket 36, shiftable fore and aft movement of the coupler plate relative to the mounting bracket and truck 34 is restricted. Coupler plate 14 need only be secured against transverse or endwise movement of the plate relative to the mounting bracket and the truck. This may be accomplished by providing leg parts 26 of the coupler plate with opposed openings 5 and by providing mounting bracket 36 with slots 54 which extend downwardly through lips 46 and side walls 44 to bottom wall 42 of the bracket. With coupler plate 14 interlocked with and centered relative to mounting bracket 36, openings 52 in the coupler plate and slots 54 in the mounting bracket will align to permit a pin 56 to be inserted therethrough. One end of pin 56 is bent at 58. The opposite end 59 of pin 56 projects outwardly from the opposite leg part 26 of the coupler plate and is provided with an opening to receive a cotter pin 60 or similar retaining means. Cotter pin 60 prevents pin 56 from being withdrawn from openings 52 and slots 54. To remove coupler plate 14 from bracket 36, cotter pin 60 need only be removed and pin 56 withdrawn from openings 52 and slots 54. The coupler plate is then free to be slid endwise from mounting bracket 36 and stored along with attached bearing plate 10 in a convenient place until it is desired to recouple the trailer to the truck. At this time, coupler plate 14 is again slid endwise into mounting bracket 36 and pin 56 reinserted through aligned openings 52 and slots 54. Cotter pin 60 is reattached to end 59 of the pin.

Figure 7:
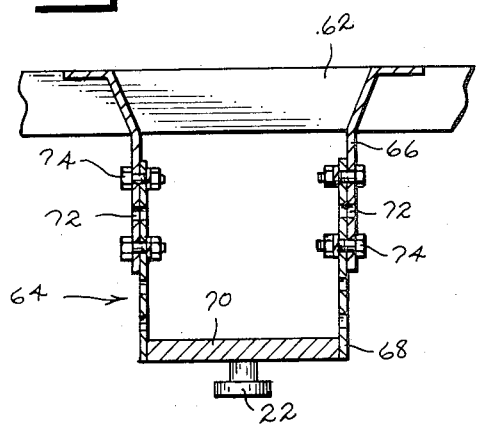
FIG. 7 is a sectional view taken along line 7—7 of FIG. 5 showing the kingpin located in one selected vertical position.
Figure 8:
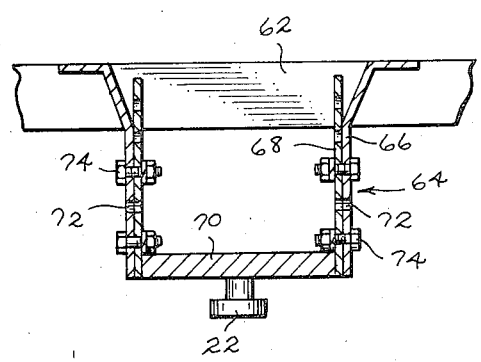
FIG. 8 is a sectional view like FIG. 7 showing the kingpin located in another selected vertical position.

Kingpin 22 of the trailer is connected to the frame 62 of the trailer by means of a pin box 64. Pin box 64 includes a three-sided hollow, bottomless housing or receiver part 66 which is secured at its upper edge by welding to trailer frame 62. Pin box 64 also includes a bottom part 68. Bottom part 68 is multiple-sided and includes a bottom wall 70 to which kingpin 22 is secured. Bottom part 68 fits slidably up into housing part 66 of the pin box. Each part 66 and 68 of the pin box contains a plurality of vertically aligned openings 72. Openings 72 in parts 66 and 68 can be aligned for a selected vertical position of kingpin 22 with bolts 74 or similar securement means being inserted through the aligned openings to secure bottom part 68 to housing part 66. In FIG. 7, bottom part 68 is shown in its extended lower position, while in FIG. 8 the bottom part is shown in a retracted position so as to provide a variation in vertical positioning of kingpin 22 to accommodate different types and locations of bearing plates which are secured to the towing vehicles. With kingpin 22 secured by jaws 20 in bearing plate 10, bottom wall 70 of pin box 64 will rest upon the top of bearing plate 10 and pivot relative thereto.

It is to be understood that the invention is not to be limited to the details above given, but may be modified within the scope of the appended claims.

What I claim is:

1. A fifth wheel attached to a towing vehicle and including a bearing plate adapted to support a frame member of a trailer, said frame member carrying a depending kingpin, a lock carried by said bearing plate for pivotally securing said kingpin to said plate, the improvement comprising a mounting bracket secured to said towing vehicle, said mounting bracket including a bottom wall and spaced parallel vertical side walls extending upwardly from said bottom wall, said side walls extending transversely relative to said vehicle and terminating in inturned opposing lips spaced from said bottom wall and from each other, a coupler plate, means securing said bearing plate to said coupler plate for pivotal movement about a horizontal axis transversely oriented relative to said vehicle, said coupler plate including flanged side margins generally paralleling said bearing plate pivot axis, the spacing between each mounting bracket lip and bottom wall exceeding the thickness of the flanged side margins of said coupler plate, the spacing between said mounting bracket side walls exceeding the distance between opposite edges of said flanged side margins, said distance between the opposite edges of said flanged side margins exceeding the spacing between said mounting bracket lips, said flanged side margins fitted slidably between said mounting bracket side walls with each flange side margin positioned under a said lip of said mounting bracket, and releasable locking means engaging said mounting bracket and coupler plate restricting movement of said coupler plate relative to said mounting bracket.

2. The fifth wheel hitch of claim 1 wherein said towing vehicle includes a bed defined in part by opposed upstanding side members, said mounting bracket secured to said bed between said side members, said coupler plate having opposite ends between which said flanged side margins extend, said mounting bracket being spaced from one of said vehicle side members, the spacing between said bracket and one side member exceeding the length of said coupler plate as measured between its said ends to permit said plate to be slid endwise into said bracket with the flanged side margins thereof fitting slidably under said mounting bracket lips.

3. The fifth wheel hitch of claim 1 wherein said coupler plate includes a web part having the longitudinal edges thereof formed into depending side parts, said coupler plate side parts terminating at the lower edges thereof in said flanged side margins, said coupler plate side parts having opposed openings therein located adjacently above said flanged side margins, the side walls of said mounting bracket having opposed openings therein, said openings in the mounting bracket and coupler plate being aligned when said coupler plate flanged side margins are slidably fitted under said mounting bracket lips, said locking means including a pin inserted through said openings when said openings are in alignment.

4. The fifth wheel hitch of claim 3 wherein said openings in said mounting bracket are aligned slots formed in said lips and side walls of the mounting bracket.

5. The fifth wheel hitch of claim 3 wherein said bearing plate lock releasably secures said kingpin, a pin box means for connecting said kingpin to said trailer frame member, said pin box means including an open bottom multiple-sided hollow receiver part which is secured to said trailer frame member, said pin box means also including a multiple-sided bottom part having a lower end wall, said kingpin secured to said lower end wall, said bottom part being telescopically received by said receiver part and shiftable vertically relative to the receiver part to vary the vertical location of said kingpin relative to said trailer frame member, securement means connecting said bottom part to said receiver part at a selected vertical location of said kingpin.

* * * * *